US010096017B2

(12) United States Patent
Grigg

(10) Patent No.: US 10,096,017 B2
(45) Date of Patent: *Oct. 9, 2018

(54) SYSTEM FOR CREATING AND PROCESSING CODED PAYMENT METHODS

(71) Applicant: BANK OF AMERICA CORPORATION, Charlotte, NC (US)

(72) Inventor: David M. Grigg, Rock Hill, SC (US)

(73) Assignee: Bank of America Corporation, Charlotte, NC (US)

( * ) Notice: Subject to any disclaimer, the term of this patent is extended or adjusted under 35 U.S.C. 154(b) by 369 days.

This patent is subject to a terminal disclaimer.

(21) Appl. No.: 15/045,172

(22) Filed: Feb. 16, 2016

(65) Prior Publication Data

US 2016/0162876 A1 Jun. 9, 2016

Related U.S. Application Data

(63) Continuation of application No. 13/691,523, filed on Nov. 30, 2012, now Pat. No. 9,305,293.

(51) Int. Cl.
*G06Q 20/32* (2012.01)
*G06Q 20/02* (2012.01)
*G06Q 20/06* (2012.01)
*G06Q 20/08* (2012.01)
*G06Q 20/20* (2012.01)

(52) U.S. Cl.
CPC ......... *G06Q 20/3274* (2013.01); *G06Q 20/02* (2013.01); *G06Q 20/023* (2013.01); *G06Q 20/06* (2013.01); *G06Q 20/0855* (2013.01); *G06Q 20/20* (2013.01); *G06Q 20/204* (2013.01); *G06Q 20/3276* (2013.01)

(58) Field of Classification Search
None
See application file for complete search history.

(56) References Cited

U.S. PATENT DOCUMENTS

| | | |
|---|---|---|
| 6,736,322 B2 | 5/2004 | Gobburu et al. |
| 6,886,741 B1 | 5/2005 | Salveson |
| 7,330,884 B1 | 2/2008 | Eubanks |
| 2002/0060246 A1 | 5/2002 | Gobburu et al. |
| 2003/0233276 A1 | 12/2003 | Pearlman et al. |
| 2006/0054695 A1 | 3/2006 | Owada |
| 2006/0148404 A1 | 7/2006 | Wakim |
| 2006/0293929 A1 | 12/2006 | Wu et al. |
| 2007/0078767 A1 | 4/2007 | Gendelman |

(Continued)

*Primary Examiner* — Peter Ludwig
(74) *Attorney, Agent, or Firm* — Michael A. Springs; Moore & Van Allen PLLC; Peter B. Stewart

(57) ABSTRACT

Embodiments of the invention include systems, methods, and computer-program products for a clearing house for creating and directing readable indicia to/from merchants, users, and/or vendors. As such, merchants, users, and vendors may all be able to recognize, read, and complete transactions using a created universal readable indicia, irrespective of the entities associated with the transaction. The invention may create and provide a universal readable indicia that may be read and/or scanned by any of a user, merchant, or vendor. Subsequently, upon scanning, the system may recognize the appropriate vendor associated with the scan, based on information about the user or merchant derived from the scan. As such, the invention may be able to convert the universal readable indicia to one or more indicia accepted by a vendor that may complete the transaction with the user and/or merchant.

6 Claims, 8 Drawing Sheets

(56) References Cited

U.S. PATENT DOCUMENTS

| | | |
|---|---|---|
| 2008/0133366 A1 | 6/2008 | Evans et al. |
| 2009/0084840 A1 | 4/2009 | Williams et al. |
| 2010/0138344 A1 | 6/2010 | Wong et al. |
| 2011/0251910 A1 | 10/2011 | Dimmick |
| 2012/0136698 A1 | 5/2012 | Kent |
| 2012/0221465 A1 | 8/2012 | Newsom et al. |
| 2012/0260194 A1 | 10/2012 | Kennedy et al. |
| 2012/0271712 A1 | 10/2012 | Katzin et al. |
| 2012/0284130 A1 | 11/2012 | Lewis et al. |
| 2012/0290422 A1 | 11/2012 | Bhinder |
| 2016/0162877 A1 | 6/2016 | Grigg |

SYSTEM FOR CREATING AND PROCESSING CODED PAYMENT METHODS

CROSS-REFERENCE TO RELATED APPLICATIONS

This application is a continuation of U.S. patent application Ser. No. 13/691,523, filed Nov. 30, 2012, the entirety of which is incorporated by reference herein.

BACKGROUND

Over the years, primary methods for payment and transacting have evolved from paper, cash, and checks to credit, cards, debit cards, and electronic methods. More recently, technology has allowed other methods of payments and transacting, such as using electronic devices and other devices.

When a customer uses a primary method of transacting, the transaction is typically completed quickly and effectively. However, many of the new methods of payment are only recently developed and as such that they are not universally accepted or recognized. As such, some merchants accept new methods of transacting and some do not. Furthermore, only developers or proprietors of the new technology are able to read and/or complete a transaction using the new technology. Thus resulting in slower transaction and some uncertainty arise when using new methods of transacting.

BRIEF SUMMARY

Embodiments of the present invention address the above needs and/or achieve other advantages by providing apparatuses (e.g., a system, computer program product and/or other devices) and methods for a clearing house for directing readable indicia to/from merchants, users, and/or vendors. In this way, the system may receiving, reading, creating, and communicate readable indicia to/from merchants, users, and vendors. In this way, merchants, users, and vendors may all be able to recognize, read, and complete transactions using any readable indicia, irrespective of the vendor providing the readable indicia. As such, any readable indicia may be used, recognized, or read to complete a transaction.

In some embodiments, the invention may provide merchants or users with readable indicia from one or more readable indicia vendors. In other embodiments, the invention may recognize readable indicia communicated to the system based on the vendor associated with the indicia. In yet other embodiments, the invention may provide a universal readable indicia that the invention may later be able to convert to one or more indicia accepted by a vendor. As such, the invention provides a clearing house for the directing, such as receiving, translating, and communicating readable indicia between parties of a transaction, such that each party may be able to recognize the readable indicia and complete the transaction.

The clearing house may first be set up such that the system may be able to read, recognize, and/or replicate any readable indicia provided by a readable indicia vendor. As such, the clearing house may be able to communicate to a merchant, user, or vendor in the proper format, such that the merchant, user, or vender may be able to recognize the readable indicia for a transaction. In some embodiments, the clearing house may first determine the readable indicia providing vendors. The clearing house may continuously monitor for new readable indicia and new readable indicia vendors. Once determined the clearing house may recognize the readable indicia that is provided by each vendor. As such, when the clearing house receives information associated with a readable indicia in the future, the system may recognize what vendor is associated with that readable indicia. In some embodiments, the readable indicia, the vendor, and information associated with the same may be stored within the clearing house for future referencing. As such, the clearing house may be able to direct received readable indicia, based on this stored information, to/from the appropriate readable indicia providing vendor and create, if necessary, a communication link between the vendor and a third party.

In some embodiments, the invention may provide merchants or users with readable indicia from one or more readable indicia vendors. In this way, the system may receive an indication that a merchant or a user wishes to receive a readable indicia to finish a transaction. The system may determine the appropriate readable indicia and the appropriate vendor for the transaction and communicate with that vendor. In turn, the system may then receive a readable indicia from the appropriate vendor and communicate that readable indicia to the merchant or user. For example, a user may wish to transact with a merchant using his/her user device. The merchant may communicate this wish to the system. The system may determine based on the information communicated to it, the user, and the like, an appropriate readable indicia to present to the user for the transaction. An appropriate readable indicia may include the correct vendor providing the readable indicia such that the user and merchant may be able to read/communicate via the readable indicia to complete the transaction, details about the transaction, and the like.

In other embodiments, the invention may recognize readable indicia communicated to the system based on the vendor associated with the indicia. In this way, a merchant and/or user may have used a readable indicia to complete a transaction. However, because there are a large number of vendors associated with readable indicia, the merchant or user may not know which vendor to communicate with to finalize the transaction. As such, the system may receive the readable indicia from the user and/or merchant, determine the appropriate vendor associated with the readable indicia, and communicate the readable indicia to the vendor. In some embodiments, the system may provide for a communication link between the vendor and the merchant or user. In other embodiments, the system may act as intermediately for relaying and converting communications between the vendor and the merchant or user.

In some embodiments, the invention may provide a universal readable indicia that the invention may later be able to convert to one or more indicia accepted by a vendor. The universal readable indicia may be provided to a user or merchant to complete a transaction. In this way, a user may wish to complete a transaction with his/her user device, such as a mobile phone or the like with a merchant. The system may present the merchant with a universal readable indicia for user scanning. In turn, the merchant may present the universal readable indicia to a user to complete the transaction. Upon scanning of the universal readable indicia the system may receive information associated with the scan from the merchant and/or the user. Based on the scan, the system may determine a vendor that the user and/or merchant may recognize in order to complete the transaction. As such, the system may direct the transaction information to the appropriate readable indicia vendor in order to complete the transaction.

Embodiments of the invention relate to systems, methods, and computer program products for receiving information associated with one or more vendors, wherein the one or more vendors supply readable indicia used for transactions; receiving an indication of a transaction between a user and a merchant, wherein the transaction is to be completed using a readable indicia at a point-of-transaction (POT) of the merchant; creating a universal readable indicia, wherein the universal readable indicia is able to be read by all indicia readers; providing the merchant with a universal readable indicia, such that the universal readable indicia is presented to the user for the transaction; receiving an indication that the user scanned the universal readable indicia; determining from the scanned universal readable indicia an appropriate vendor from the one or more vendors to direct the transaction; and directing the transaction to the appropriate vendor such that a communication link between the merchant and the vendor is created to complete the transaction.

In some embodiments, the appropriate vendor from the one or more vendors further comprises a vendor that the user or the merchant has a payment account associated with, such that the transaction can be completed using the payment account associated with the vendor.

In some embodiments, the invention further comprises retrieving available readable indicia associated with each of the one or more vendors; and storing the available readable indicia associated with each of the one or more vendors, information about the vendor, and data associated with the available readable indicia such that a vendor associated with each of the available readable indicia is identifiable based on a partial reading of the available readable indicia.

In some embodiments, the invention further comprises allowing for processing of the transaction using the universal readable indicia, such that the appropriate vendor authorizes the transaction; and creating a direct communication link between the appropriate vendor and the merchant of the transaction.

In some embodiments, retrieving available readable indicia associated with each of the one or more vendors comprises continuously monitoring each of the one or more vendors and retrieving newly created available readable indicia from the one or more vendors.

In some embodiments, determining from the scanned universal readable indicia an appropriate vendor from the one or more vendors to direct the transaction further comprises: determining information related to a user mobile device associated with the scanned universal readable indicia and communicating with the one or more vendors to determine if the user is associated with the vendor, wherein determining if the user is associated with the vendor is based at least in part on the information related to the mobile device.

In some embodiments, the universal readable indicia comprises a Quick Response (QR) code. In some embodiments, the universal readable indicia is comprised in a tag that transmits information wirelessly.

In some embodiments, the invention further comprises receiving an indication that the user selected the universal readable indicia at a point-of-transaction (POT) of the merchant, wherein the indication that the user selected the universal readable indicia is received from a mobile device that comprises an image-capturing component, and wherein an image of the readable indicia used for the transaction is captured by the mobile device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
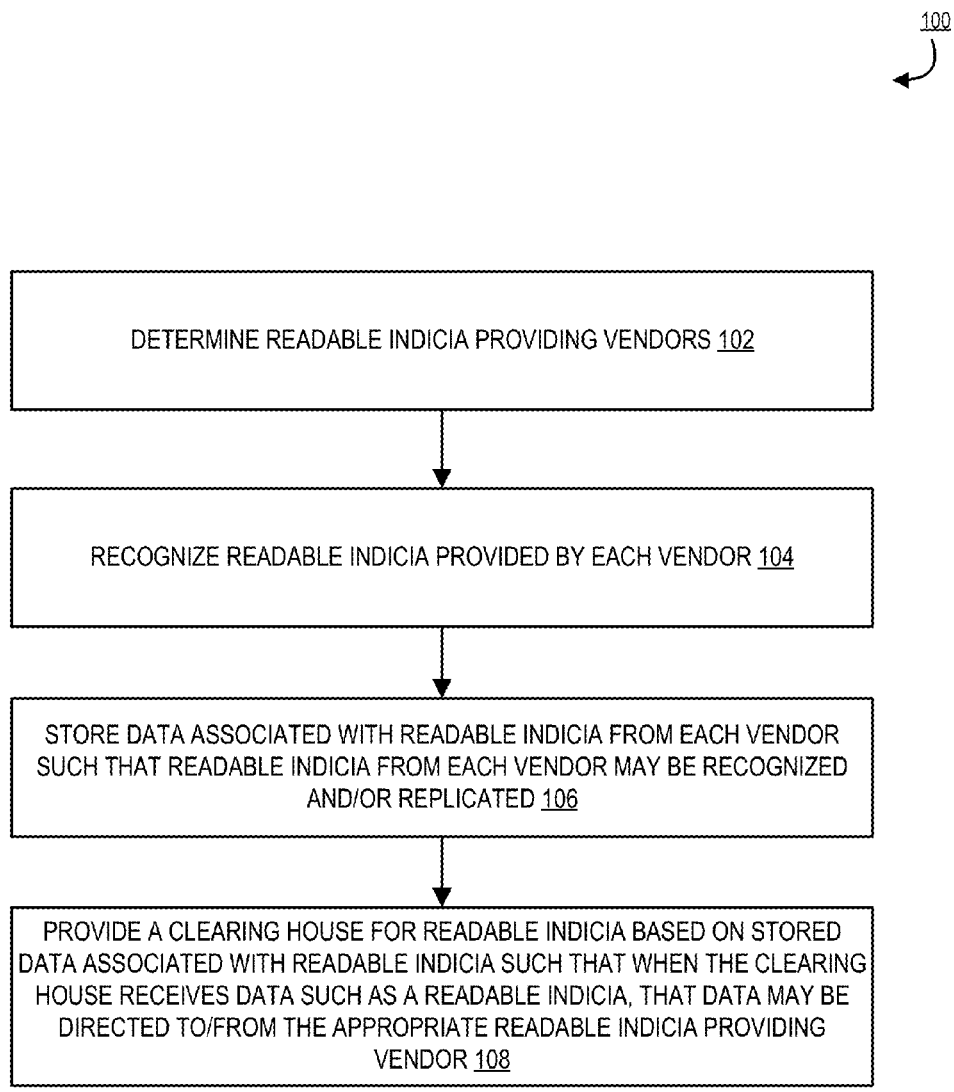
Figure 1B:
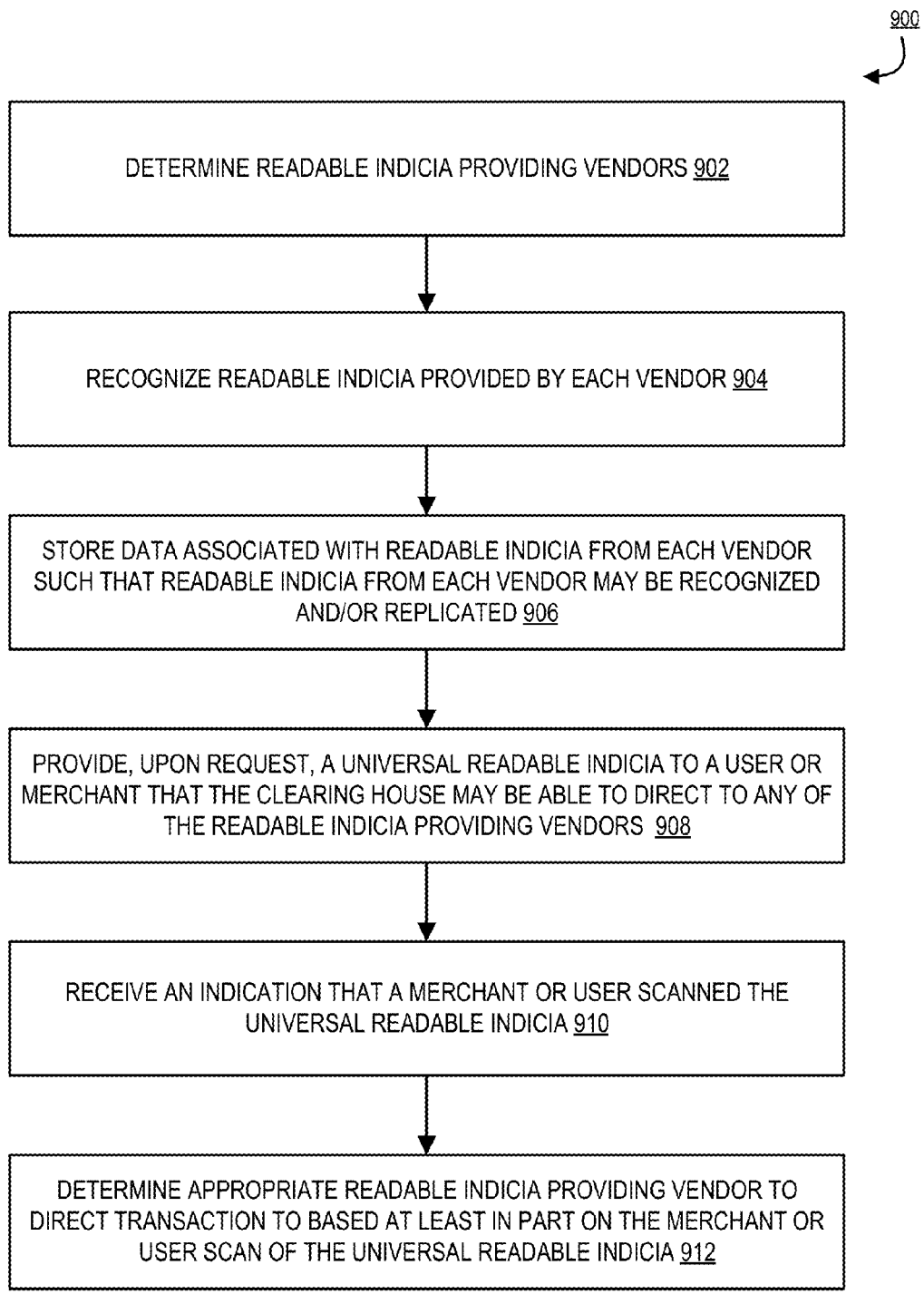
Figure 2:
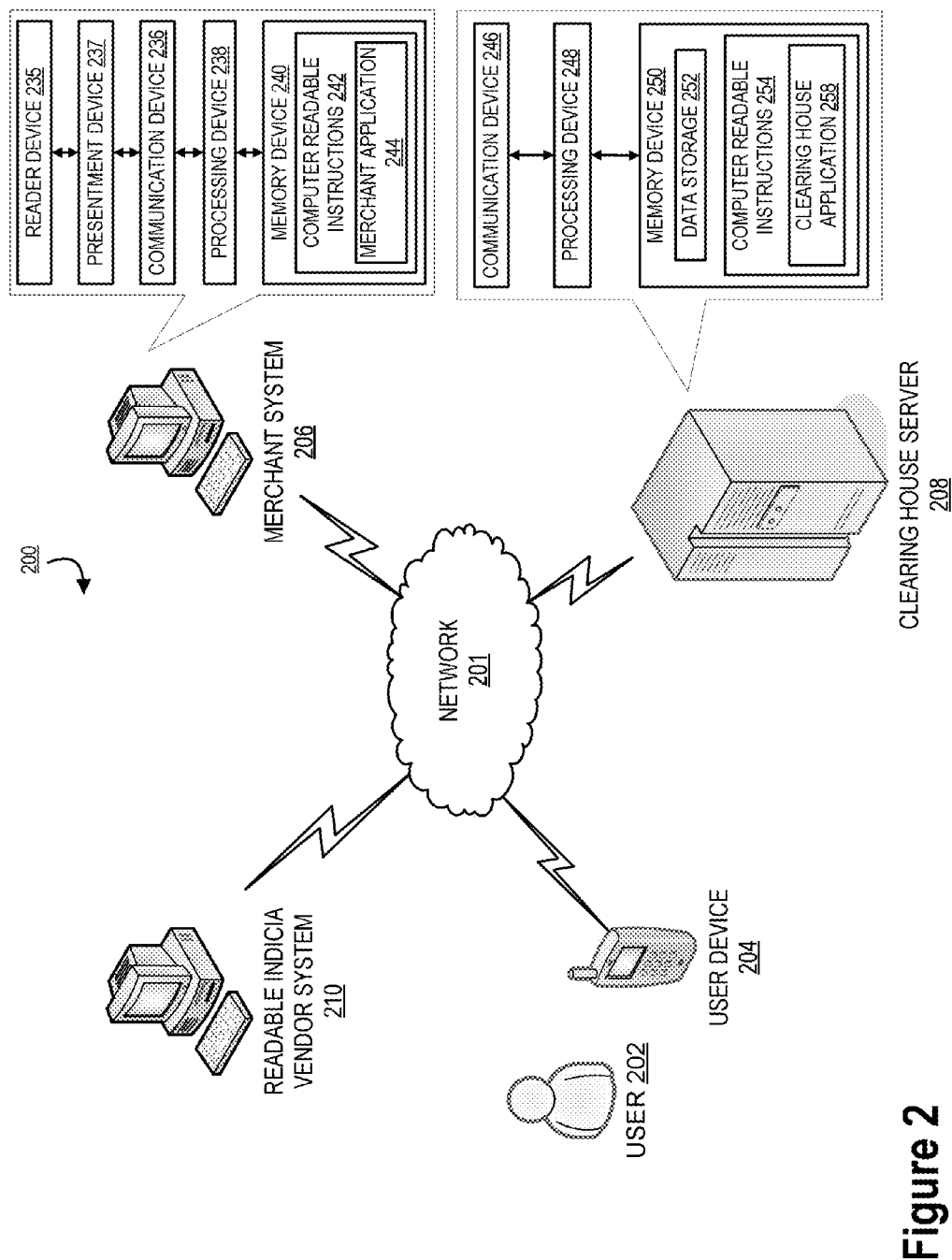
Figure 3:
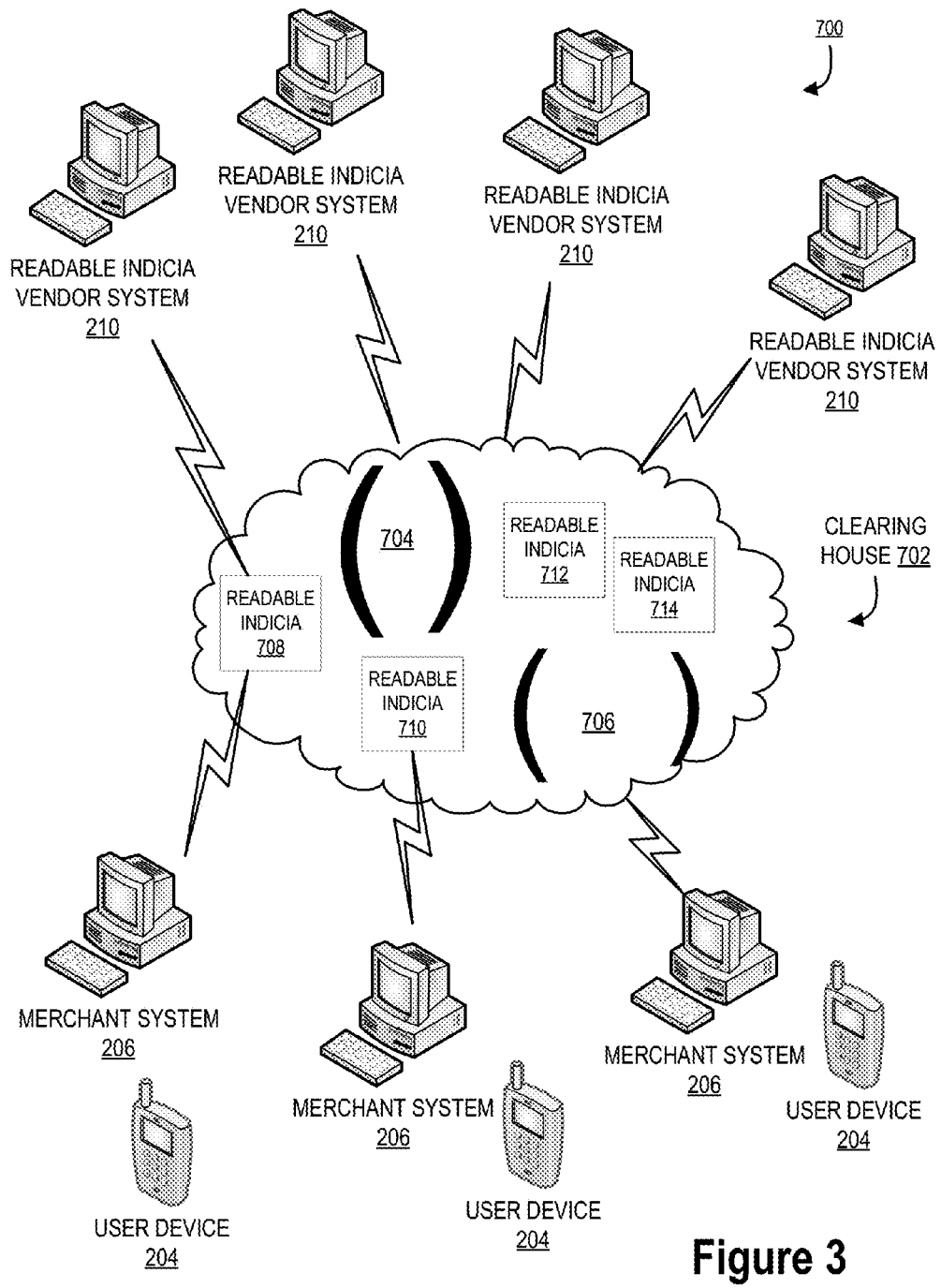
Figure 4:
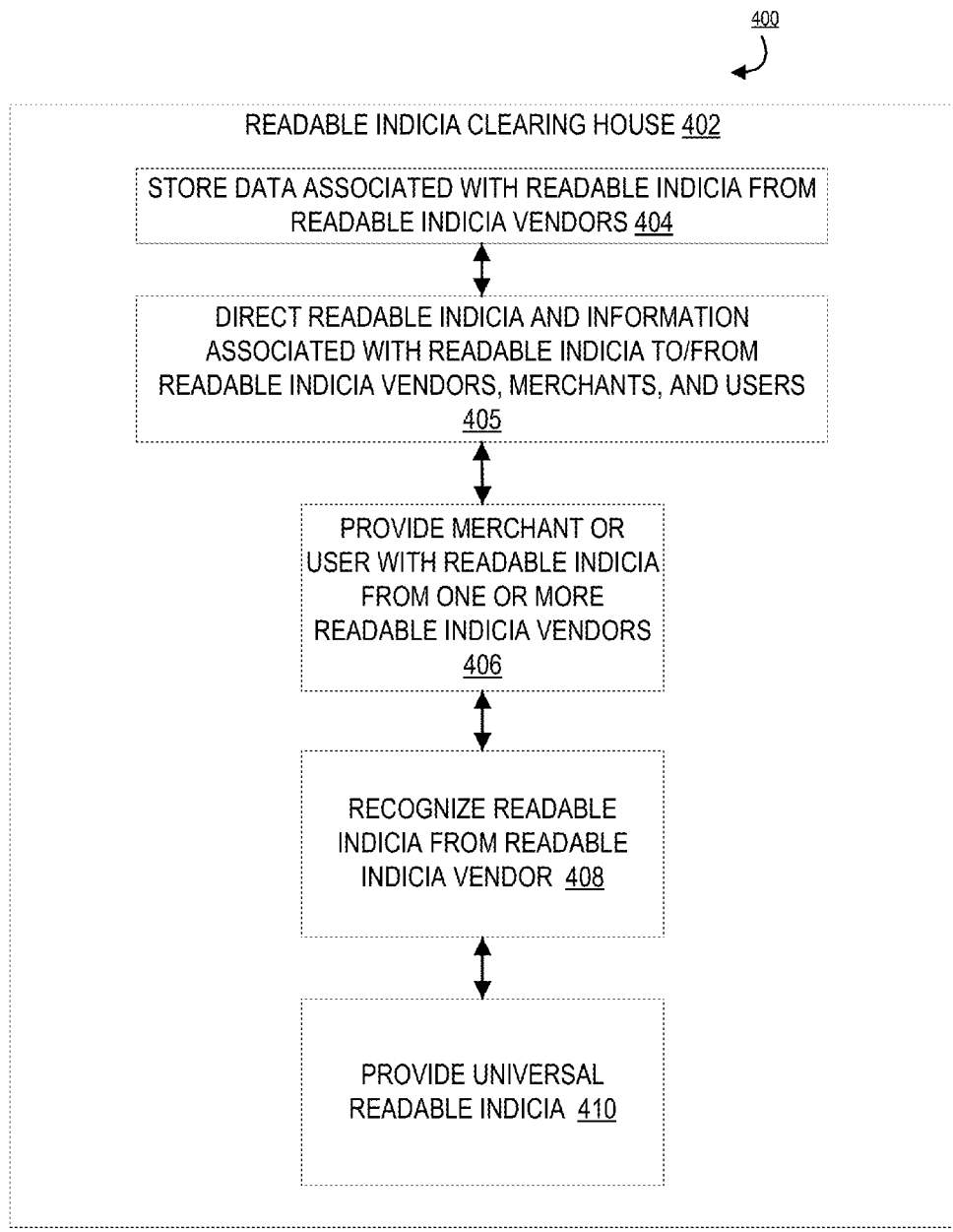
Figure 5:
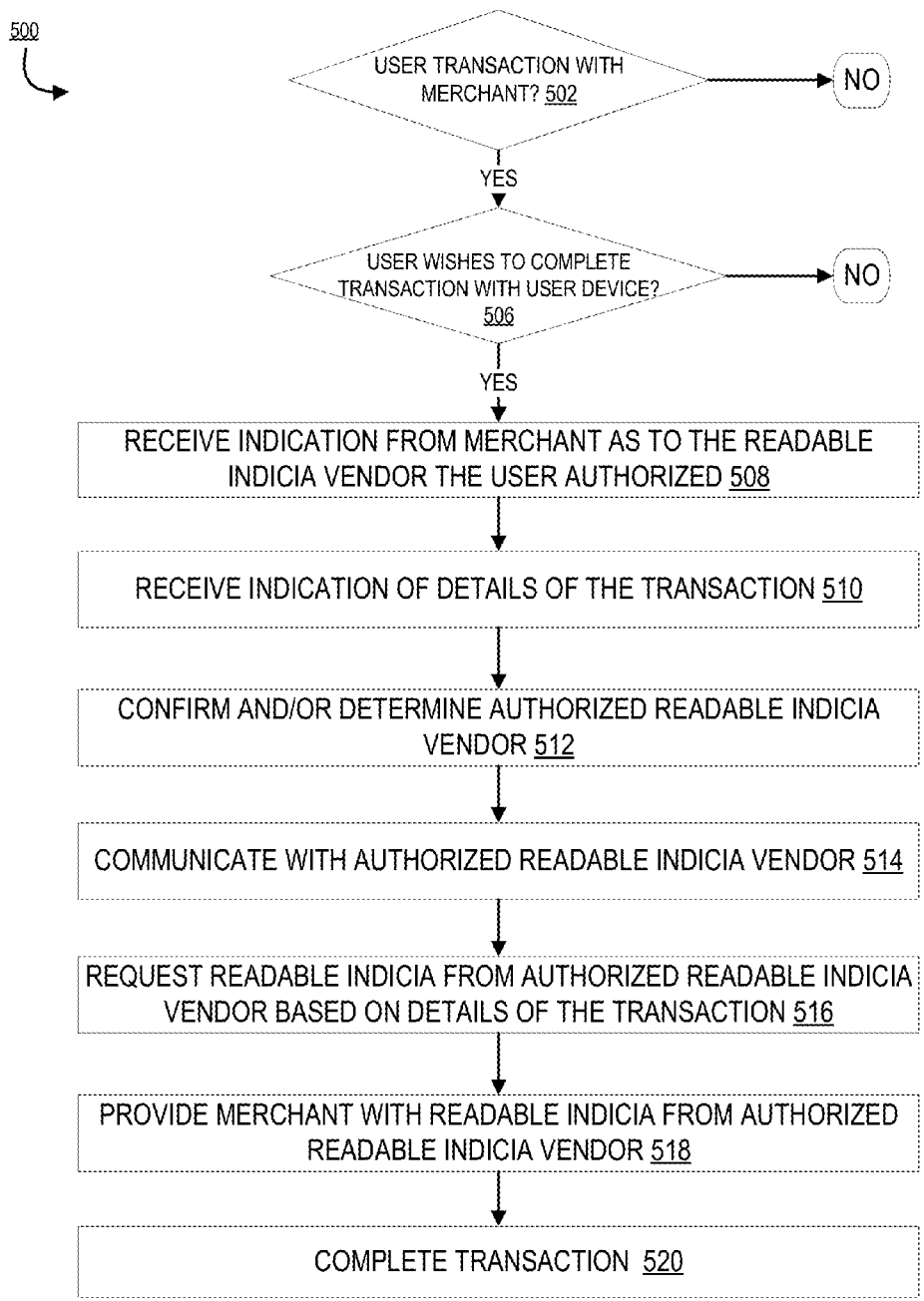
Figure 6:
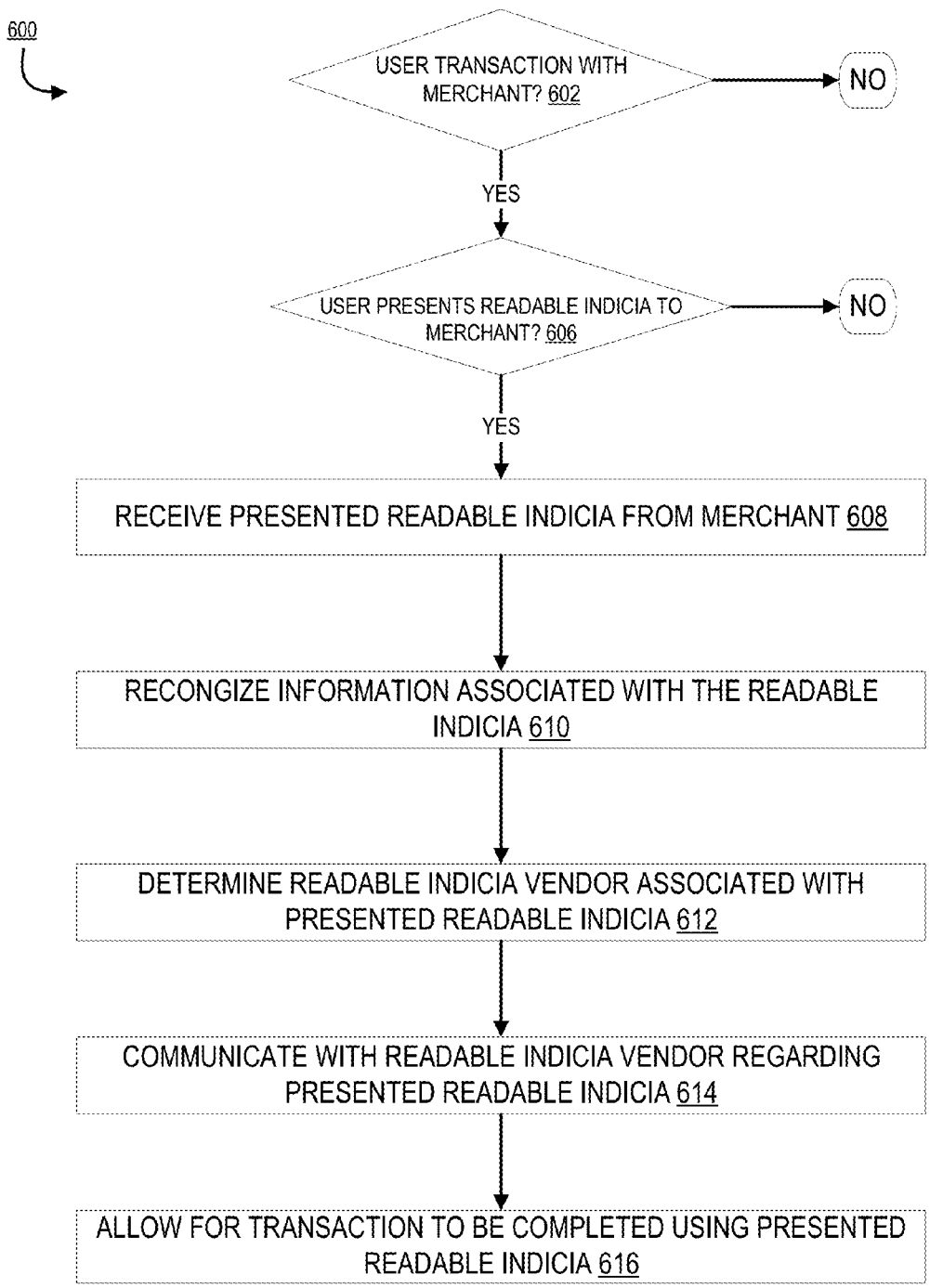
Figure 7:
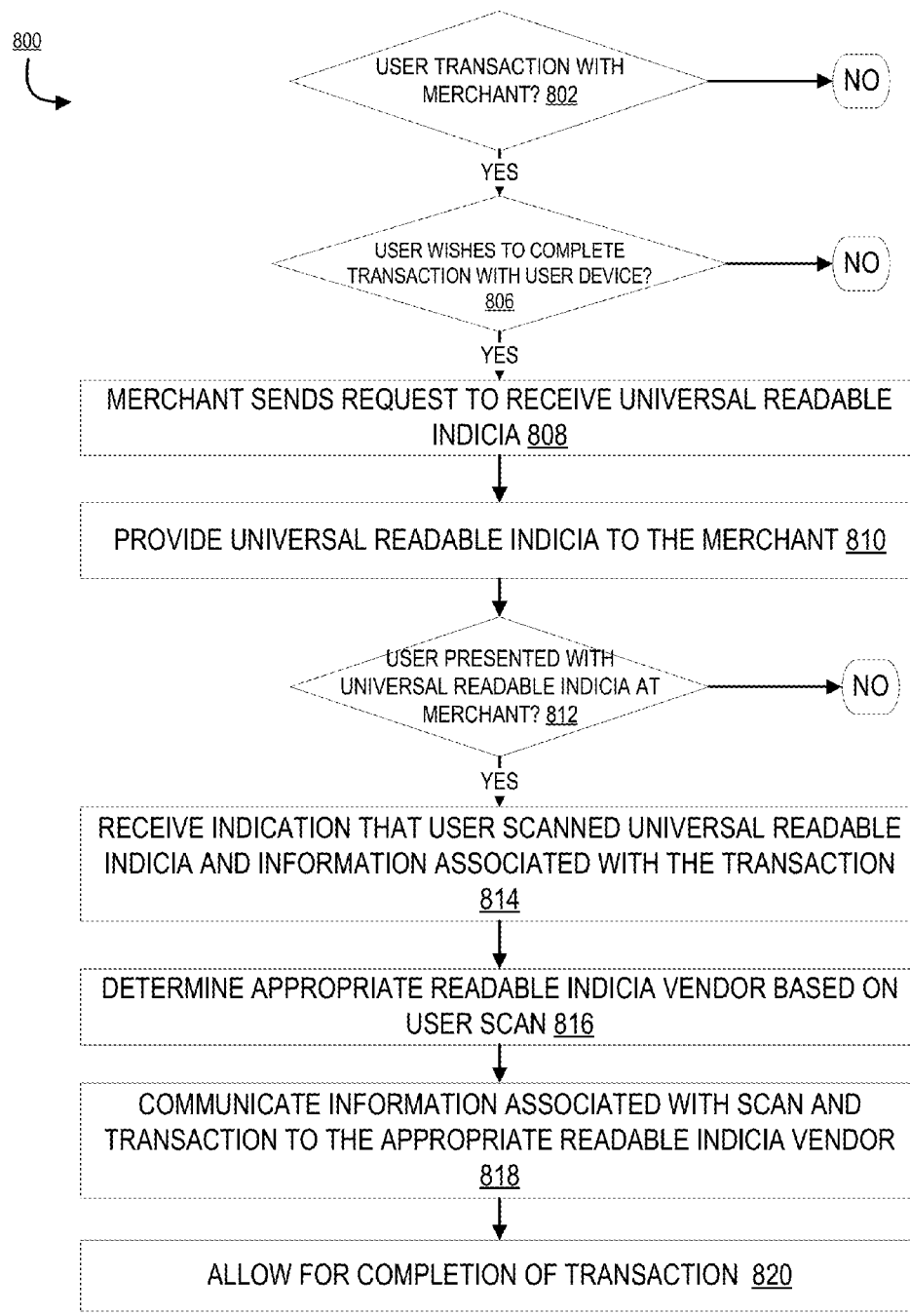

Having thus described embodiments of the invention in general terms, reference will now be made to the accompanying drawings, wherein:

FIGS. 1a-1b provide a high level process flow illustrating using a readable indicia clearing house, in accordance with one embodiment of the present invention;

FIG. 2 provides a readable indicia clearing house processing system environment, in accordance with one embodiment of the present invention;

FIG. 3 provides a readable indicia clearing house system process flow, in accordance with one embodiment of the present invention;

FIG. 4 provides a readable indicia clearing house process flow, in accordance with one embodiment of the present invention;

FIG. 5 provides a decision map illustrating an embodiment of the readable indicia clearing house process, in accordance with one embodiment of the present invention;

FIG. 6 provides a decision map illustrating an embodiment of the readable indicia clearing house process, in accordance with one embodiment of the present invention; and FIG. 7 provides a decision map illustrating an embodiment of the readable indicia clearing house process, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. The term "readable indicia" as used herein may include, but is not limited to a bar code, quick response (QR) code, token, contact connection, near field connection, contactless connection, and/or the like. A "merchant" as used herein may refer to a manufacturer, retailer, product provider, service provider, event provider, warehouse, supplier, medical service provider, medical treatment provider and/or the like. A "vendor," "readable indicia vendor," or "readable indicia providing vendor" may be any entity that may provide proprietary, specific, or universal readable indicia and/or maintain readable indicia for transaction completion purposes. Furthermore, as used herein, the term "product" shall mean any good, service, event, and/or the like that may be offered by a merchant.

Further, the embodiments described herein may refer to use of a transaction or transaction event. Unless specifically limited by the context, a "transaction" refers to any communication between the user and a merchant, financial institution, insurance company, or other entity. A "transaction" may also include a bill, statement, purchase at a POT, online purchase, purchase at a merchant, and/or the like. For example, in some embodiments, a transaction may include one or more of the following: purchasing, renting, leasing, bartering, selling, and/or leasing goods and/or services (e.g., groceries, stamps, tickets, DVDs, vending machine items, or the like); withdrawing cash; making payments to creditors (e.g., paying monthly bills; paying federal, state, and/or local taxes and/or bills; or the like); sending remittances; transferring balances from one account to another account; loading money onto stored value cards (SVCs) and/or prepaid cards; donating to charities; and/or the like. For example, a transaction may occur when a user purchases a product at a merchant. In yet other embodiments, for example, a transaction may occur when an entity associated with the user is alerted. A transaction may occur when a user accesses a building, uses a rewards card, and/or performs an account balance query. A transaction may occur as a user's device establishes a wireless connection, such as a Wi-Fi connection, with a point-of-transaction terminal.

In still further embodiments, a transaction may refer to an event and/or action or group of actions facilitated or performed by a user's device, such as a user's mobile system, a merchant system, and/or a combination thereof. A device capable of facilitating or performing a transaction may be referred to herein as a "POT system" or "POT device." A "point-of-transaction" or "POT" could refer to any location, virtual location or otherwise proximate occurrence of a transaction. A POT system may refer to any device used to perform a transaction, either from the user's perspective, the merchant's perspective or both. In some embodiments, the POT system refers only to a user's system, in other embodiments it refers only to a merchant system, and in yet other embodiments, it refers to both a user device and a merchant device interacting to perform a transaction. For example, in one embodiment, the POT system refers to the user's mobile device configured to communicate with a merchant's system, whereas in other embodiments, the POT system refers to a merchant's system configured to communicate with a user's mobile device, and in yet other embodiments, the POT system refers to both the user's mobile device and the merchant's system configured to communicate with each other to carry out a transaction.

In some embodiments, a POT system is or includes an interactive computer terminal that is configured to initiate, perform, complete, and/or facilitate one or more transactions. A POT system could be or include any device that a user may use to perform a transaction with an entity, such as, but not limited to, an ATM, a loyalty device such as a rewards card, loyalty card or other loyalty device, a magnetic-based payment device (e.g., a credit card, debit card, or the like), a personal identification number (PIN) payment device, a contactless payment device (e.g., a key fob), a radio frequency identification device (RFID) and the like, a computer, (e.g., a personal computer, tablet computer, desktop computer, server, laptop, or the like), a mobile device (e.g., a smartphone, cellular phone, personal digital assistant (PDA) device, MP3 device, personal GPS device, or the like), a merchant terminal, a self-service machine (e.g., vending machine, self-checkout machine, or the like), a public and/or business kiosk (e.g., an Internet kiosk, ticketing kiosk, bill pay kiosk, or the like), a gaming device, and/or various combinations of the foregoing.

In some embodiments, a POT system is operated in a public place (e.g., on a street corner, at the doorstep of a private residence, in an open market, at a public rest stop, or the like). In other embodiments, the POT system, is additionally or alternatively operated in a place of business (e.g., in a retail store, post office, banking center, grocery store, factory floor, or the like). In accordance with some embodiments, the POT system is not owned by the user of the POT system. Rather, in some embodiments, the POT system is owned by a mobile business operator or a POT operator (e.g., merchant, vendor, salesperson, or the like). In yet other embodiments, the POT system is owned by the financial institution offering the POT system providing functionality in accordance with embodiments of the invention described herein.

FIG. 1a provides a high level process flow illustrating using a readable indicia clearing house 100, which will be discussed in further detail throughout this specification with respect to FIGS. 2 through 7. The first step in the process 100, as illustrated in block 102 is to determine the readable indicia providing vendors. In some embodiments, the system may continuously monitor for new readable indicia providing vendors. In some embodiments, the readable indicia providing vendors may communicate with the system to determine that the entity is a readable indicia providing vendor. As illustrated in block 104, the next step in the process 100 is to recognize readable indicia provided by each vendor. In this way, the system may determine the vendor and each of the readable indicia of the vendor. Along with recognizing each readable indicia from the various vendors, the system may identify unique characteristics such as codes, numbers, sequences, embeds, or the like associated with the readable indicia of each vendor. This way, not only would the entire readable indicia be able to be recognized as belonging to a specific vendor, partial illustrations of a readable indicia may also be recognizable.

As illustrated in block 106, the system may then store the data associated with the readable indicia from each of the vendors. In this way, when the system receives unknown readable indicia, the system may be able to review the stored readable indicia from each vendor and as such may be able to recognize and/or replicate the readable indicia, if necessary. As illustrated in block 108, the next step in the process 100 is to provide a clearing house for readable indicia based on the stored data associated with the readable indicia. In this way, when the clearing house receives data such as a readable indicia, partial readable indicia, and/or a request for a readable indicia, the information associated with the received data may allow the clearing house to direct the received data to/from the appropriate readable indicia providing vendor.

FIG. 1b provides another embodiment of a high level process flow illustrating using a readable indicia clearing house 900. Similar to FIG. 1a, the first step in the process 900, as illustrated in block 902 is to determine the readable indicia providing vendors. As illustrated in block 904, the next step in the process 900 is to recognize readable indicia provided by each vendor. In this way, the system may determine the vendor and each of the readable indicia of the vendor. Along with recognizing each readable indicia from the various vendors, the clearing house may identify unique characteristics such as codes, numbers, sequences, embeds, or the like associated with the readable indicia of each vendor. This way, not only would the entire readable indicia be able to be recognized as belonging to a specific vendor, partial illustrations of a readable indicia may also be recognizable. As illustrated in block 906, the clearing house may then store the data associated with the readable indicia from each of the vendors. Next, as illustrated in block 908, the clearing house will provide, upon request, a universal readable indicia to a user or merchant that the clearing house may be able to use and direct data associated with the scanned universal readable indicia to any of the readable indicia providing vendors. In this way, the clearing house may create a readable indicia that may be read and/or scanned by any reader device, such that no matter the transaction, a user may be able to utilize a readable indicia for the transaction.

As illustrated in block 910, the clearing house may receive an indication that a merchant or user scanned the universal readable indicia. The clearing house may receive information associated with the scan, including but not limited to the location of the transaction, information about the merchant and user associated with the transaction, and/or the like. Next, as illustrated in block 912 the clearing house may determine an appropriate readable indicia providing vendor to direct the transaction to based at least in part on the merchant or user scan and the information obtained in block 910. In this way, the clearing house may connect the merchant and/or user with the appropriate vendor that may be able to complete the transaction. For example, a user may have an account with Vendor 1 and wish to complete a transaction with a merchant using a readable indicia. The merchant may not know that the user has an account with Vendor 1 and as such present the user with a universal readable indicia. Once scanned, the information associated with the scan may be received by the clearing house. The clearing house may determine that the user has an account with Vendor 1 based on the scan. As such, the clearing house may provide the transaction information from the scan to Vendor 1 to complete the transaction.

FIG. 2 provides a readable indicia clearing house processing system environment 200, in accordance with one embodiment of the present invention. As illustrated in FIG. 2, the clearing house server 208 is operatively coupled, via a network 201 to the user device 204, to the readable indicia vendor system 210, and to the merchant system 206. In this way, the clearing house server 208 can send information to and receive information from the user device 204, readable indicia vendor system 210, and the merchant system 206 to provide a clearing house for directing readable indicia to/from merchants, users, and/or vendors. In this way, the system may receiving, reading, creating, distribute, and communicate readable indicia to/from merchants, users, and vendors. In this way, merchants, users, and vendors may all be able to recognize, read, and complete transactions using any readable indicia, irrespective of the vendor providing the readable indicia. As such, any readable indicia may be used, recognized, or read to complete a transaction. FIG. 2 illustrates only one example of an embodiment of a readable indicia clearing house processing system environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network.

In some embodiments, the user 202 is an individual making a transaction. The transaction may be made at a merchant system 206 of a merchant, online or offline, at the merchant's place of business, statement received, and/or other transaction means. Furthermore, the user 202 may use his/her user device 204, such as a mobile device, mobile wallet (e.g. smart phone, PDA, or the like) or other types of payment system that may communicate with merchant system 206 or the clearing house server 208 to allow the user 202 to complete a transaction. Furthermore, in some embodiments, the user 202 may be a merchant or a person, employee, agent, independent contractor, or the like acting on behalf of the merchant to enter into a transaction.

As illustrated in FIG. 2, the clearing house server 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the merchant system 206, readable indicia vendor system 210, and the user device 204. As such, the communication device 246 generally comprises a modem, server, or other device for communicating with other devices on the network 201.

As further illustrated in FIG. 2, the clearing house server 208 comprises computer-readable instructions 254 stored in the memory device 250, which in one embodiment includes the computer-readable instructions 254 of a clearing house application 258. In some embodiments, the memory device 250 includes data storage 252 for storing data related to the clearing house application 258 including but not limited to data created, stored, and/or used by the clearing house application 258.

In the embodiment illustrated in FIG. 2 and described throughout much of this specification, the clearing house application 258 allows for the receiving, reading, creating, and communicating of readable indicia to/from merchants, users, and vendors.

In some embodiments, the clearing house application 258 may receive readable indicia from merchants and/or readable indicia vendors. In this way, in some embodiments, the clearing house application 258 may be able to request readable indicia from readable indicia vendor systems 210, merchant systems 206, and/or user devices 204. In other embodiments, the clearing house application 258 may receive, without requesting, readable indicia from readable indicia vendor systems 210, merchant systems 206, and/or user devices 204. Once the readable indicia is received, irrespective of the source, the clearing house application 258 may store the readable indicia, the vendor associated with the readable indicia, and data associated with the readable indicia, such as codes, identifications, sequences, or the like in the memory device 250 of the clearing house server 208.

In some embodiments, the clearing house application 258 may store the received readable indicia in the memory device 250. In this way, the stored readable indicia and information associated with the readable indicia may be used to later identify and read readable indicia received at the clearing house server 208.

In some embodiments, the clearing house application 258 may have the ability to read any readable indicia. As such, any universal readable indicia, vender specific readable indicia, proprietary readable indicia, partial readable indicia, or the like may be read by the clearing house application 258. The clearing house application 258 may be able to recognize and read partial images, scans, or the like of readable indicia, such as partial portions of a QR code, bar code, numeric code, or the like. As such, the clearing house application 258 may recognize the readable indicia from any vendor. Thus, identify the vendor associated with any readable indicia.

In some embodiments, the clearing house application 258 may create readable indicia. In this way, the clearing house application 258 may create universal readable indicia that may be scanned by any user device 204 and/or merchant system 206. In this way, the clearing house application 258 may then be able to take the scanned information from the created universal readable indicia to tailor it to be accepted by any vendor, such that a transaction may be able to be completed using any readable indicia vendor.

In some embodiments, the clearing house application 258 may communicate information associated with a readable indicia and/or a readable indicia across the network to the readable indicia vendor system 210, the merchant system 206, or the user device 204. Furthermore, the clearing house application 258 may also link various devices on the network 201 to allow for direct communication between the various devices.

In some embodiments, the clearing house application 258 may provide merchants or users readable indicia from one or more readable indicia vendors based on a request from the merchant or user 202. In this way the clearing house application 258 may communicate readable indicia from the readable indicia vendor systems 210 to one or more of the merchant system 206 or the user device 204, via the network 201. In some embodiments, the merchant or user may request readable indicia from a specific vendor. In this way, the clearing house application 258 may receive the request and obtain a readable indicia from the specific vendor of the request. The clearing house application 258 may subsequently communicate the readable indicia to the user 202 or merchant. In other embodiments, the clearing house application 258 may determine the appropriate readable indicia vendor. The clearing house application 258 may determine the appropriate readable indicia based on the request from the merchant or user. The request may include information that may allow the clearing house application 258 to determine readable indicia vendors that would be able to authorize the transaction. In this way, the user 202 or merchant may have an account with one or more of the vendors or have another association with the vendor such that the merchant system 206 or user device 204 may be able to read and/or recognize readable indicia from a specific vendor. Once the clearing house application 258 determines the appropriate vendor, the clearing house application 258 may obtain a readable indicia from the appropriate vendor. The clearing house application 258 may subsequently communicate the readable indicia to the user 202 or merchant.

In other embodiments, the clearing house application 258 may recognize readable indicia received from a user device 204 or merchant system 206 and determine the appropriate vendor associated with the indicia. As such, the clearing house application 258 may receive a readable indicia from a user 202 or merchant. This may be via a communication from a user device 204 or the merchant system 206 through the network 201. The readable indicia may be used between the user 202 and the merchant to complete a transaction, such as payment by the user 202 for the products of the transaction. The user 202 or the merchant may send the readable indicia to the clearing house application 258. The clearing house application 258 may recognize the received readable indicia as well as determine information associated with the transaction based on the communication from the user 202 or merchant. As such, the clearing house application 258 may determine the vendor from which the readable indicia was originally created. The clearing house application 258 may then communicate the recognized readable indicia to the readable indicia vendor system 210. For example, a user 202 may present a QR code to a merchant as payment for a transaction. The merchant may not know the vendor associated with the QR code nor may the merchant be able to read the data associated with the QR code. As such, the merchant may send the QR code to the clearing house application 258, such that the clearing house application 258 may determine the vendor associated with the presented QR code. The clearing house application 258 may then notify the appropriate readable indicia vendor system 210 and, in some embodiments, provide an intermediary for communication between the vendor and the merchant to finalize the transaction. In this way, the clearing house application 258 may translate signals and/or communications between the various entities such that the data communicated may be in the appropriate format for the other to read. In other embodiments, the clearing house application 258 may communicably link the readable indicia vendor system 210 with the user device 204 and/or the merchant system 206 such that those systems may directly communicate to complete the transaction.

In some embodiments, the invention may provide a universal readable indicia that the invention may later be able to convert to one or more indicia accepted by a vendor. In this way, the clearing house application 258 may receive an indication that a user 202 may wish to complete a transaction with a merchant using a readable indicia. As such, the clearing house application 258 may provide a universal readable indicia to a user 202 or merchant that the clearing house application 258 may direct to any of the vendors. The universal readable indicia may be read by any reader, scanner, or the like. As such, the universal readable indicia may be scanned and recognized by any user device 204 and/or merchant system 206. In some embodiments, the clearing house application 258 may create a readable indicia that may be read and/or scanned by any reader device, such that no matter the transaction, a user 202 or merchant may be able to utilize a readable indicia for the transaction.

When the clearing house application 258 receives an indication that a merchant or user 202 has scanned the universal readable indicia, the clearing house application 258 receives information associated with the scan, including but not limited to the location of the transaction, information about the merchant and user associated with the transaction, and/or the like. Next, the clearing house application 258 may determine an appropriate readable indicia providing vendor to direct the transaction to, based at least in part on the merchant or user 202 scan and the information obtained from the scan. Once the clearing house application 258 determines the appropriate readable indicia providing vendor, the clearing house application 258 may communicate via the network 201 to the readable indicia vendor system 210. The appropriate readable indicia providing vendor may be the vendor that the user 202 or merchant may have an account with, may have a user device 204 or merchant system 206 that may be able to recognize or communicate with. In this way, the clearing house application 258 may connect the merchant system 206 and/or the user 202 (via the user device 204) with the appropriate readable indicia vendor system 210 that may be able to complete the transaction.

As illustrated in FIG. 2, the merchant system 206 generally comprises a reading device 235, a presentment device 237, a communication device 236, a processing device 238, and a memory device 240. The reading device 235 is operatively coupled to the processing device 238, communication device 236, and the memory device 240. The merchant system 206 may include a reader device 235 to receive and/or provide readable indicia to/from the user 202 through the user device 204 and/or other potential user 202 payment devices. Such a reader device 235 may include, but is not limited to a magnetic strip reader, a bar code scanner, a radio frequency (RF) reader, a character recognition device, a magnetic ink reader, an NFC reading device, a processor for interpreting codes presented over an electrical or optical medium, a biometric reader, a wireless receiving device, and/or the like.

The merchant system 206 may also comprise a presentment device 237. The presentment device 237 may present the readable indicia to a user 202 during a transaction. A person of ordinary skill in the art will appreciate that the presentment device 237 may be a standalone device, may be incorporated into the merchant system 206 (such as in the reader device 235), and/or the like. The presentment device 237 may include a screen presentment, reflection presentment, augmented image presentment, touchless communication, touch communication, or other medium that may be viewable and/or scannable.

As further illustrated in FIG. 2, the merchant system 206 comprises computer-readable instructions 242 stored in the memory device 240, which in one embodiment includes the computer-readable instructions 242 of a merchant application 244. A merchant system 206 may refer to any device that may be configured to carry out a transaction.

In some embodiments, a merchant system 206 is or includes an interactive computer terminal that is configured to initiate, perform, complete, and/or facilitate one or more transactions, as well as communicate readable indicia to and from the other systems of the network. A merchant system 206 could be or include any means that a user 202 may use to perform a transaction with an merchant, such as, but not limited to, an ATM, a loyalty device such as a rewards card, loyalty card or other loyalty device, a magnetic-based payment device (e.g., a credit card, debit card, or the like), a personal identification number (PIN) payment device, a contactless payment device (e.g., a key fob), a radio frequency identification device (RFID) and the like, a computer, (e.g., a personal computer, tablet computer, desktop computer, server, laptop, or the like), a mobile device (e.g., a smartphone, cellular phone, personal digital assistant (PDA) device, MP3 device, personal GPS device, or the like), a merchant terminal, a self-service machine (e.g., vending machine, self-checkout machine, or the like), a public and/or business kiosk (e.g., an Internet kiosk, ticketing kiosk, bill pay kiosk, or the like), a gaming device, and/or various combinations of the foregoing.

In the embodiment illustrated in FIG. 2, the merchant application 244 allows the merchant system 206 to be communicably linked to the clearing house server 208 and other devices on the network 201 to communicate, via a network 201, an indication that the user 202 is at a merchant system 206, receive presented readable indicia, present readable indicia to a user 202, and provide information related to the transaction being made.

In some embodiments, the merchant application 224 may provide the other devices with an indication that the user 202 is at a POT and initiating a transaction with a merchant. The indication that a user 202 is at a merchant system 206 may be communicated when the user 202 approaches the POT, when a product is initially scanned at a POT, when the user 202 scans the indicia, when the user 202 is sent a statement, and/or when the user 202 provides a payment method for purchase of the products of the transaction.

In some embodiments, the merchant application 224 may receive presented readable indicia. In this way, the user 202 may present a readable indicia with his/her user device 204 at the merchant. In this way, the merchant application 224 may be able to receive the presented readable indicia, such that the received readable indicia may be communicated to the clearing house server 208.

In some embodiments, the merchant application 244 may present indicia to the user 202. In some embodiments, the indicia may be presented initially to indicate that a user 202 is initiating a transaction at a POT. In this way, a communication link is formed between the systems such that the user 202 may be sent information associate with the transaction and the readable indicia from the clearing house server 208 and/or the readable indicia vendor system 210 to his/her user device 204. In some embodiments, the indicia may be presented based on the products of the transaction or the appropriate vendor. The readable indicia may be sent to the merchant application 244 from the clearing house server 208 for the user 202 to scan from the presentment device 237. The readable indicia may, in some embodiments, provide, within the indicia, information associate with the transaction, or the like.

FIG. 2 also illustrates a user device 204. The user device 204 is operatively coupled to the readable indicia vendor system 210, the merchant system 206, and the clearing house server 208 through the network 201. The user device 204 has systems with devices the same or similar to the devices described for the readable indicia vendor system 210, the merchant system 206, and the clearing house server 208 (i.e., a communication device, a processing device, and a memory device). Therefore, the user device 204 communicates with the readable indicia vendor system 210, the merchant system 206, and the clearing house server 208 in the same or similar way as previously described with respect to each system. The user device 204, in some embodiments, is comprised of systems and devices that allow the user 202 to send and/or read readable indicia such that the user 202 may be able to complete a transaction using the readable indicia via the user device 204. A "user device" 204 may be any mobile communication device, such as a cellular telecommunications device (e.g., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like. Although only a single user device 204 is depicted in FIG. 2, the system environment 200 may contain numerous user devices 204.

In some embodiments, the user device 204 allows a user 202 to scan and/or recognize a readable indicia. The user 202 may scan the indicia using the camera functionality, scanning functionality, or the like of his/her user device 204. The user device 2-4 may then recognize the readable indicia and/or the information associate with the readable indicia. Upon recognition of the readable indicia, the user device 204 may, in some embodiments, present the user 202 with information associate with transaction via an interface associated with the user device 204. In other embodiments, upon recognition of the indicia the user device 204 may communicate with the clearing house server 208 to transmit user 202 data and receive available information associate with the transaction.

In some embodiments, the user device 204 may decode the indicia that was scanned. In some embodiments, the user device 204 may decode the indicia that includes information associate with the transaction. In this way, upon decoding the indicia, the user device 204 may present information associate with the transaction to the user 202 via an interface associated with the user device 204. In other embodiments, the user device 204 may decode the indicia to find instructions to communicate with the clearing house server 208. In this way, upon decoding the indicia, the user device 204 may communicate with the clearing house server 208.

Once the indicia is decoded, the user device 204 may present the information associate with transaction to the user 202 and/or the clearing house server 208.

Finally, the user device 204 may communicate readable indicia to systems on the network 201. The readable indicia may be communicated to the clearing house server 208, the readable indicia vendor system 210, and/or the merchant system 206 via the network 201. The readable indicia may be applied to the transaction the user 202 is currently entering into and/or future transactions.

FIG. 2 also illustrates a readable indicia vendor system 210. The readable indicia vendor system 210 is operatively coupled to the user device 204, the merchant system 206, and the clearing house server 208 through the network 201. The readable indicia vendor system 210 has systems with devices the same or similar to the devices described for the user device 204, the merchant system 206, and the clearing house server 208 (i.e., a communication device, a processing device, and a memory device). Therefore, the readable indicia vendor system 210 communicates with the user device 204, the merchant system 206, and the clearing house server 208 in the same or similar way as previously described with respect to each system. The readable indicia vendor system 210, in some embodiments, is comprised of systems and devices that allow a vendor to send and/or retrieve readable indicia such that the vendor may be able to complete a transaction using the readable indicia for a user 202. Although only a single readable indicia vendor system 210 is depicted in FIG. 2, the system environment 200 may contain numerous readable indicia vendor systems 210.

In some embodiments, the readable indicia vendor system 210 may be the systems associated with the vendors that provide, manage, create, or develop the readable indicia that the user 202 or merchant may use to complete a transaction.

The servers, systems, and devices described herein may also communicate with various other servers, systems, and devices not illustrated herein. As such, the servers, systems, and devices may communicate with insurance company servers, payment processing servers, or the like.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 3 illustrates a readable indicia clearing house system process flow 700, in accordance with one embodiment of the present invention. The clearing house 702 allows for directing readable indicia to/from merchants, users 202, and/or vendors. As such, any readable indicia may be used, recognized, or read to complete a transaction. In some embodiments, the clearing house 702 may allow a readable indicia vendor system 210 to directly communicate with a merchant system 206 and/or a user device 204. As such, the clearing house may receive and/or create a readable indicia 708 that may allow the clearing house 702 to create a communication link between a vendor, merchant, and/or user 202 such that a transaction may be completed using a readable indicia.

In some embodiments, the clearing house 702 may receive a readable indica 710 from a merchant system 206 and/or a user device 204. In this way, the clearing house 702 may recognize the readable indicia 710 and determine the appropriate readable indicia vendor system 210 based on the readable indicia 710 and data associated with the same. In this way, the clearing house 702 determined the appropriate readable indicia vendor system 210 and created a communication channel 704 between the readable indicia vendor system 210 such that the clearing house 702 may act, in some embodiments, as an intermediary for communication between the two systems to complete the transaction. In some embodiments, the clearing house 702 may allow for a direct communication link between the systems.

In some embodiments, the clearing house 702 may pull readable indicia 712, 714 from readable indicia vendor systems 210. In some embodiments, the readable indicia 712, 714 may be pulled based on selection from the user or merchant, or may be selected by the clearing house 702. In this way, a communication channel 704 may be created such that the selected readable indicia 712, 714 may be directed to the merchant system 206 and/or user device 204.

FIG. 4 illustrates a readable indicia clearing house process flow 400, in accordance with one embodiment of the present invention. The readable indicia clearing house 402 stores data associated with the readable indicia from one or more readable indicia vendors, as illustrated in block 404. Once the readable indicia clearing house 402 stores data associated with readable indicia and readable indicia the readable indicia clearing house 402 may direct readable indicia and information associated with the readable indicia to/from readable indicia vendors, merchants, and users 202, as illustrated in block 405.

In some embodiments, as illustrated in block 406, the readable indicia clearing house 402 may provide merchants or users 202 with readable indicia from one or more readable indicia vendors. In this way, the readable indicia clearing house 402 may receive an indication that a merchant or a user 202 wishes to receive a readable indicia to finish a transaction. The readable indicia clearing house 402 may determine the appropriate readable indicia and the appropriate vendor for the transaction and communicate with that vendor. In turn, the readable indicia clearing house 402 may then receive a readable indicia from the appropriate vendor and communicate that readable indicia to the merchant or user.

In some embodiments, as illustrated in block 408 the readable indicia clearing house 402 may recognize readable indicia received as being from a specific readable indicia vendor. In this way, the readable indicia may be communicated to the readable indicia clearing house 402. The readable indicia clearing house 402 may determine the vendor associated with the indicia based on the information received, such as codes, sequences, features, or the like. In this way, a merchant and/or user 202 may have used a readable indicia to complete a transaction irrespective of the vendor that the readable indicia is associated with.

In some embodiments, as illustrated in block 410 the readable indicia clearing house 402 may provide a universal readable indicia that the readable indicia clearing house 402 may later be able to convert to one or more indicia accepted by a vendor. The universal readable indicia may be provided to a user 202 or merchant to complete a transaction. In this way, a user 202 may wish to complete a transaction with his/her user device 204, such as a mobile phone or the like with a merchant. The readable indicia clearing house 402 may present the merchant with a universal readable indicia for user 202 to scan. In turn, the merchant may present the universal readable indicia to a user 202 to complete the transaction. Upon scanning of the universal readable indicia the readable indicia clearing house 402 may receive information associated with the scan from the merchant and/or the user 202. Based on the scan, the system may determine a vendor that the user 202 and/or merchant may recognize in order to complete the transaction.

FIG. 5 provides a decision map illustrating an embodiment of the readable indicia clearing house process 500, in accordance with one embodiment of the present invention. As illustrated in decision block 502 the user 202 may decide to transaction with a merchant. If the user 202 decides not to transact with the merchant, the process 500 is terminated. If the user 202 wishes to transaction with the merchant, the user 202 may wish to complete the transaction with a user device, as illustrated in decision block 506. If the user 202 decides not to transact using his/her mobile device, the process 500 is terminated. If the user 202 decides to complete the transaction with his/her user device in decision block 506, the user 202 may then request readable indicia from a specific vendor. The request may come from the user 202 via his/her user device and/or the POT associated with the merchant. As such, the system may receive an indication from the merchant as to the readable indicia vendor the user 202 has authorized, as illustrated in block 508. The indication may include information that may allow the system to determine readable indicia vendors that would be able to authorize the transaction. In this way, the user 202 or merchant may have an account with one or more of the vendors or have another association with the vendor such that the merchant or user 202 may be able to read and/or recognize readable indicia from a specific vendor.

Once the user 202 has selected an authorized readable indicia vendor, the system may also receive an indication of the details of the transaction, as illustrated in block 510. These details may include one or more of the products of the transaction, the price associated with the transaction, and/or the like.

Next, the system may communicate with the authorized readable indicia vendor to confirm and/or determine the appropriate readable indicia vendor, as illustrated in block 512. Once confirmed, the system may communicate with the authorized readable indicia vendor, as illustrated in block 514. In this way, the system may open a communication link between the vendor, user 202, and/or the merchant, such that a transaction may be completed between the user 202 and the merchant.

Next, as illustrated in block 516, the system may request the readable indicia from the authorized readable indicia vendor based on the details of the transaction. In this way, the user 202 and/or the merchant may be able to read and/or communicate based on the readable indicia from the authorized vendor.

As such, the system may provide the merchant with the readable indicia from the authorized readable indicia vendor, as illustrated in block 518. In this way, the system may have provided the vendor with the details of the transaction and been provided a readable indicia from the vendor and/or created a readable indicia associated with the authorized vendor based on the transaction details. The readable indicia may have then been provided to the merchant, as illustrated in block 518.

Next, as illustrated in block 518, the system may provide the merchant with the readable indicia from the authorized readable indicia vendor and/or the created readable indicia. In this way, the readable indicia provided to the merchant may be readable and/or scannable by each of the merchant and the user 202 such that the transaction may be completed, as illustrated in block 520. In this way, the transaction may be completed using the readable indicia that has been authorized by the user 202 such that the user 202, merchant, and vendor may be in communication to finalize the transaction. As such, even if the merchant that the user 202 is transacting with does not have the capabilities of accessing the authorized vendor, the system may be able to access the appropriate vendor and allow for a link to complete the transaction.

FIG. 6 provides a decision map illustrating an embodiment of the readable indicia clearing house process 600, in accordance with one embodiment of the present invention. FIG. 6 illustrates an embodiment of the invention wherein the system may recognize readable indicia received from a user 202 or merchant and determine the appropriate vendor associated with the indicia such that the system may provide a communication link between the merchant or user 202 and the appropriate vendor such that the transaction may be completed with any presented readable indicia.

As illustrated in decision block 602 the user 202 may decide to transaction with a merchant. If the user 202 decides not to transact with the merchant, the process 600 is terminated. If the user 202 wishes to transaction with the merchant, the user 202 may wish to complete the transaction with a user device. If the user 202 decides to complete the transaction with his/her user device, the user 202 may present a readable indicia to the merchant, as illustrated in decision block 606. If the user 202 does not present a readable indicia to the merchant, the process 600 is terminated. If the user 202 does present a readable indicia to a merchant, the system may receive the presented readable indicia from the merchant once presented by the user 202, as illustrated in block 608. In this way, the system may receive a readable indicia from a user 202 or merchant. Once the readable indicia is received, the system may recognize the readable indicia and/or the information associated with the readable indicia, as illustrated in block 610.

Next, as illustrated in block 612, the system may recognize the received readable indicia as well as determine information associated with the transaction based on the communication from the user 202 or merchant. As such, the system may determine the vendor from which the readable indicia was originally created or associated with. As illustrated in block 614, the system may then communicate with a readable indicia vendor regarding the presented readable indicia. As such, the system may have recognized the presented readable indicia and communicated with the vendor associated with the readable indicia.

For example, a user 202 may present a QR code to a merchant as payment for a transaction. The merchant may not know the vendor associated with the QR code nor may the merchant be able to read the data associated with the QR code. As such, the merchant may send the QR code to the system, such that the system may determine the vendor associated with the presented QR code. The system may then notify the appropriate vendor and as illustrated in block 616 allow for the transaction to be completed using the presented readable indicia.

FIG. 7 provides a decision map illustrating an embodiment of the readable indicia clearing house process 800, in accordance with one embodiment of the present invention. FIG. 7 illustrates an embodiment of the invention that may provide a universal readable indicia that the system may later be able to convert to one or more indicia accepted by a vendor. In this way, the system may receive an indication that a user 202 may wish to complete a transaction with a merchant using a readable indicia. As such, the system may provide a universal readable indicia to a user 202 or merchant that the system may direct to any of the vendors. The universal readable indicia may be read by any reader, scanner, or the like. As such, the universal readable indicia may be scanned and recognized by any user device 204 and/or merchant system 206. In some embodiments, the clearing house application 258 may create a readable indicia that may be read and/or scanned by any reader device, such that no matter the transaction, a user 202 or merchant may be able to utilize a readable indicia for the transaction.

As illustrated in decision block 802 the user 202 may decide to transaction with a merchant. If the user 202 decides not to transact with the merchant, the process 800 is terminated. If the user 202 wishes to transaction with the merchant, the user 202 may wish to complete the transaction with a user device, as illustrated in block 806. If the user 202 does not decide to complete the transaction with his/her user device the process may be terminated. If the user 202 decides to complete a transaction with a user device, in decision block 806, the merchant may send a request to receive a universal readable indicia from the system, as illustrated in block 808. Next, as illustrated in block 810, the system may provide a universal readable indicia to a user 202 or merchant that the system may be able to use and direct data associated with the scanned universal readable indicia to any of the readable indicia providing vendors. In this way, the system may create a readable indicia that may be read and/or scanned by any reader device, such that no matter the transaction, a user may be able to utilize a readable indicia for the transaction.

As illustrated in decision block 812, the user 202 may be presented with the universal readable indicia at the merchant. If the user 202 is not presented with the indicia, then the process 800 is terminated. If the user 202 is presented with the universal readable indicia at the merchant, the system may receive an indication that the user 202 scanned the universal readable indicia and information associated with the transaction, as illustrated in block 814. The system may receive information associated with the scan, including but not limited to the location of the transaction, information about the merchant and user 202 associated with the transaction, and/or the like. Next, as illustrated in block 816, the system may determine an appropriate readable indicia providing vendor to direct the transaction to based at least in part on the merchant or user scan and the information obtained. In some embodiments, this information may include information associated with the user device 204 such as specific codes, numbers, or other identifiers. In this way, the system may connect the merchant and/or user 202 with the appropriate vendor that may be able to complete the transaction. In some embodiments, the user 202 may have an association with one vendor. In other embodiments, the user 202 may have an associated with more than one vendor. If the system detects more than one vendor associated with the user 202 or merchant, the system may present the user 202 with options as to which vendor he/she wishes to direct the transaction to. In this way, the user 202 may select via his/her user device 204 which vendor to direct the readable indicia to and finalize the transaction with.

As illustrated in block 818, the system may communicate information associated with the transaction to the appropriate readable indicia vendor. Finally, as illustrated in block 820 once the information associated with the scan is communicated to the appropriate readable indicia vendor, the system may allow for the transaction to be completed. In this way, the system may provide a communication link for the vendor and merchant or user 202 to communicate. In other embodiments, the system may allow for a direct communication between the vendor and the user or merchant.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, or the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a verity of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, or the like) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer-implemented method for creating and processing readable indicia for payment codes, the method comprising:

receiving, through a distributive network having a processor device from a merchant device of a merchant, the readable indicia comprising information to complete a transaction between a user and the merchant, and information including an identity of a vendor among a plurality of vendors that created the readable indicia wherein the vendor is capable of authorizing the transaction via the merchant device scanning of the readable indicia, and wherein the merchant device is incapable of reading the received readable indicia from the vendor, wherein the merchant device received the readable indicia from a user via a mobile device of the user;

identifying the vendor capable of authorizing the transaction, from among the plurality of vendors, by identifying data feeds processed by the processing device from the distributive network based on the received readable indicia;

in response to identifying the vendor, creating, by the processing device, a universal readable indicia for the transaction between the user and the merchant, wherein the merchant device is capable of scanning the universal readable indicia and the vendor is capable of authorizing the transaction using the universal readable indicia;

providing the user, via the mobile device associated with the user, the universal readable indicia to complete the transaction between the user and the merchant, wherein the merchant device scans the universal readable indicia from the mobile device;

in response to the merchant device scanning the universal readable indicia, creating a communicable link that allows for relaying and converting communications into compatible communications for and between the vendor and the merchant, thereby allowing incompatible systems associated with the vendor and the merchant to communicate via the distributive network to complete the transaction that could not be otherwise completed based on incompatibility between a system associated with the merchant and a system associated with the vendor; and finalizing the transaction between the user and the merchant by allowing the system associated with the vendor to authorize the transaction via the communicable link.

2. The computer implemented method of claim 1, wherein the system of the vendor provides the user's mobile device with a payment account, such that the transaction can be completed using the payment account associated with the vendor.

3. The computer implemented method of claim 1 further comprising:

retrieving available readable indicia associated with the vendor; and storing the available readable indicia associated with the vendor, information about the vendor, and data associated with the available readable indicia such that the vendor associated with each of the available readable indicia is identifiable based on a partial reading of the available readable indicia.

4. The computer implemented method of claim 1 further comprising:

allowing for processing of the transaction using the universal readable indicia, such that the vendor associated with the universal readable indicia authorizes the transaction; and creating a direct communication link between the vendor and the merchant of the transaction.

5. The computer implemented method of claim 1, wherein determining the vendor further comprises:
   determining information related to a user mobile device associated with the readable indicia; and
   communicating with the plurality of vendors to determine if the vendor-user is associated with the vendor, wherein determining if the vendor-user is associated with the vendor of the plurality of vendors is based at least in part on the information related to the vendor-user mobile device.

6. The computer implemented method of claim 1 further comprising receiving an indication that the user selected the readable indicia at a point-of-transaction (POT) of the merchant, wherein the indication that the user selected the readable indicia is received from a mobile device that comprises an image-capturing component, and wherein an image of the readable indicia used for the transaction is captured by the mobile device.

\* \* \* \* \*